US012607766B2

(12) United States Patent
Teague et al.

(10) Patent No.: US 12,607,766 B2
(45) **Date of Patent: \*Apr. 21, 2026**

(54) DETECTING ANOMALIES IN ANNULAR MATERIALS OF SINGLE AND DUAL CASING STRING ENVIRONMENTS

(71) Applicant: Visuray Intech Ltd (BVI), Road Town (VG)

(72) Inventors: Philip Teague, Houston, TX (US); Alex Stewart, San Francisco, CA (US)

(73) Assignee: Visuray Technology Ltd, Sliema (MT)

( * ) Notice: Subject to any disclaimer, the term of this patent is extended or adjusted under 35 U.S.C. 154(b) by 0 days.

This patent is subject to a terminal disclaimer.

(21) Appl. No.: 17/383,010

(22) Filed: Jul. 22, 2021

(65) Prior Publication Data

US 2021/0349234 A1 Nov. 11, 2021

Related U.S. Application Data

(63) Continuation of application No. 15/903,155, filed on Feb. 23, 2018, now abandoned.

(Continued)

(51) Int. Cl.
*G01V 5/12* (2006.01)
*G01N 9/00* (2006.01)
(Continued)

(52) U.S. Cl.
CPC ................. *G01V 5/12* (2013.01); *G01N 9/00* (2013.01); *G01N 9/24* (2013.01); *G01V 1/46* (2013.01);
(Continued)

(58) Field of Classification Search
CPC ........... G01V 5/12; G01V 5/104; E21B 47/01
See application file for complete search history.

(56) References Cited

U.S. PATENT DOCUMENTS 3,321,627 A 5/1967 Tittle
3,564,251 A 2/1971 Youmans
(Continued)

FOREIGN PATENT DOCUMENTS

GB 2497857 A 6/2013
WO WO2012/058579 A2 5/2012
WO WO2016/032698 A1 3/2016

OTHER PUBLICATIONS

Notification of Transmittal of the International Search Report and the Written Opinion of the International Searching Authority regarding the corresponding PCT International Application No. PCT/US2018/019359; May 17, 2018; 12 pages.

*Primary Examiner* — Blake C Riddick
(74) *Attorney, Agent, or Firm* — Adams & Reese LLP; John Henry Scott, III

(57) ABSTRACT

An x-ray based cement evaluation tool for measurement of the density of material volumes within single, dual and multiple-casing wellbore environments is provided, the tool including at least an internal length comprising a sonde section, wherein said sonde section further comprises an x-ray source; a radiation shield for radiation measuring detectors; sonde-dependent electronics; and a plurality of tool logic electronics and PSUs, wherein the tool uses x-rays to illuminate the formation surrounding a borehole and a plurality of detectors are used to directly measure the density of the cement annuli and any variations in density within. Detectors used to measure casing standoff such that other detector responses are compensated for tool stand-off and centralization; a plurality of reference detectors is used to monitor the output of the x-ray source, and a shortest-axial offset detector is configured to distribute incoming photons into energy classifications such that photoelectric measurements may be made.

20 Claims, 8 Drawing Sheets

Related U.S. Application Data

(60) Provisional application No. 62/464,174, filed on Feb. 27, 2017.

(51) Int. Cl.

| | |
|---|---|
| *G01N 9/24* | (2006.01) |
| *G01V 1/46* | (2006.01) |
| *G01V 13/00* | (2006.01) |
| *G21K 1/10* | (2006.01) |
| *H05G 1/02* | (2006.01) |

(52) U.S. Cl.
CPC ............... *G01V 13/00* (2013.01); *G21K 1/10* (2013.01); *H05G 1/02* (2013.01)

(56) References Cited

U.S. PATENT DOCUMENTS

| | | | |
|---|---|---|---|
| 3,976,879 A | 8/1976 | Turcotte | |
| 4,386,422 A | 5/1983 | Mumby et al. | |
| 4,433,240 A | 2/1984 | Seeman | |
| 4,450,354 A | 5/1984 | Smith, Jr. et al. | |
| 4,464,569 A | 8/1984 | Flaum | |
| 4,883,956 A | 11/1989 | Melcher et al. | |
| 5,012,091 A * | 4/1991 | Moake | G01V 5/12 |
| | | | 250/269.3 |
| 5,081,611 A | 1/1992 | Hornby | |
| 5,090,039 A | 2/1992 | Gard et al. | |
| 5,326,970 A | 7/1994 | Bayless | |
| 6,078,867 A | 6/2000 | Plumb et al. | |
| 6,725,161 B1 | 4/2004 | Hillis et al. | |
| 6,876,721 B2 | 4/2005 | Siddiqui | |
| 7,634,059 B2 | 12/2009 | Wraight | |
| 7,675,029 B2 | 3/2010 | Ramstad et al. | |
| 7,705,294 B2 | 4/2010 | Ramstad et al. | |
| 8,138,471 B1 | 3/2012 | Shedlock et al. | |
| 8,481,919 B2 | 7/2013 | Teague et al. | |
| 8,867,040 B2 | 10/2014 | Pope et al. | |
| 9,012,836 B2 | 4/2015 | Wilson et al. | |
| 2003/0042426 A1 * | 3/2003 | McGregor | G01V 5/02 |
| | | | 250/393 |
| 2003/0136916 A1 * | 7/2003 | Kearfott | G01V 5/02 |
| | | | 250/394 |
| 2008/0061225 A1 | 3/2008 | Orban et al. | |
| 2009/0072767 A1 * | 3/2009 | Ernst | H05H 7/02 |
| | | | 315/504 |
| 2010/0004867 A1 * | 1/2010 | Zhou | G01V 5/12 |
| | | | 250/269.3 |
| 2010/0017134 A1 * | 1/2010 | Steinman | G01V 5/12 |
| | | | 250/363.01 |
| 2011/0284732 A1 * | 11/2011 | Korkin | E21B 47/005 |
| | | | 250/269.1 |
| 2011/0285398 A1 | 11/2011 | Villegas et al. | |
| 2012/0126105 A1 | 5/2012 | Evans et al. | |
| 2012/0312530 A1 | 12/2012 | Pope et al. | |
| 2013/0009049 A1 | 1/2013 | Smaardyk et al. | |
| 2013/0287174 A1 * | 10/2013 | Zhou | H01J 35/116 |
| | | | 378/143 |
| 2013/0308753 A1 | 11/2013 | Groves et al. | |
| 2014/0076551 A1 | 3/2014 | Pelletier et al. | |
| 2015/0168593 A1 * | 6/2015 | Simon | G01V 5/12 |
| | | | 250/261 |
| 2015/0177409 A1 | 6/2015 | Sofiienko et al. | |
| 2016/0061991 A1 | 3/2016 | Berkcan et al. | |
| 2016/0161385 A1 * | 6/2016 | Lexa | G01V 5/12 |
| | | | 702/6 |
| 2016/0282505 A1 * | 9/2016 | Lee | G01V 5/125 |
| 2016/0291198 A1 | 10/2016 | Lee et al. | |
| 2017/0045640 A1 | 2/2017 | Zhang et al. | |
| 2017/0218749 A1 * | 8/2017 | Lee | E21B 47/005 |
| 2018/0180765 A1 | 6/2018 | Teague et al. | |
| 2018/0329110 A1 | 11/2018 | Hu et al. | |

\* cited by examiner

102

103

101

104

105

204

201

203

205

202

301
302
303
304
305
306

310

308

307

309

DETECTING ANOMALIES IN ANNULAR MATERIALS OF SINGLE AND DUAL CASING STRING ENVIRONMENTS

FIELD OF THE INVENTION

The present invention relates generally to methods and means for detecting anomalies in annular materials, and in a particular though non-limiting embodiment to methods and means for detecting anomalies in the annular materials of single and dual casing string environments.

BACKGROUND

Within the oil and gas industry, the requirement to gauge the quality of cement through multiple casings is paramount as is the ability to determine the status of the annuli. The industry currently employs various methods for the verification of the hydraulic seal behind a single casing string. Typically, ultrasonic tools are run within the well to determine whether cement is bonded to the outside of the casing, thereby indicating the presence of cement in the annulus between the casing and formation, or between the casing and an outer casing. Ultimately, a pressure test is required to ensure that zonal isolation has been achieved as ultrasonic tools are highly dependent upon quality of the casing, the bond between the casing and the material in the annulus, and the mechanical properties of the material in the annulus to be able to work correctly. In addition, ultrasonic tools treat the material in the annulus as a single isotropic and homogenous volume, any actual deviation away from this ideal leads to inaccuracies in the measurement.

Current tools can offer information regarding the cement bond of the innermost casing yet lack the ability to discriminate various depths into the cement or annular material. This can lead to the possibility that fluid-migration paths may exist at the cement-formation boundary, within the cement itself, or between the casing and an outer casing, thereby leading to a loss of zonal isolation.

No viable technologies are currently available which are able to determine the radial and azimuthal position of anomalies within the annular region (up to the cement-formation boundary) to ensure that no fluid-paths exist which may pose a risk to zonal isolation and well integrity.

Prior art teaches a variety of techniques that use x-rays or other radiant energy to inspect or obtain information about the structures within or surrounding the borehole of a water, oil or gas well, yet none teach methods or means capable of accurately analyzing the azimuthal and radial position of anomalies in the annular materials surrounding a well-bore in single or multi-string cased well environments. In addition, none teach of a method of accurately analyzing the azimuthal position of anomalies with a means which includes a centralized (non-padded) tool that is concentric with the well casing, rather than being a 'padded' tool that required the source and detector assemblies to be in contact with said casing.

For example, U.S. Pat. No. 3,564,251 to Youmans discloses the use of a azimuthally scanning collimated x-ray beam that is used to produce an attenuated signal at a detector for the purposes of producing a spiral-formed log of the inside of a casing or borehole surface immediately surrounding the tool, effectively embodied as an x-ray caliper. However, the reference fails to disclose either a means or method to achieve such through the steel wall of a single or multiple well casings, and is therefore unable to discriminate the signal from behind said casings from annular materials, such as cement.

U.S. Pat. No. 7,675,029 to Teague et al. teaches an apparatus that permits the measurement of x-ray backscattered photons from any horizontal surface inside of a borehole that refers to two-dimensional imaging techniques.

U.S. Pat. No. 7,634,059 to Wraight provides a concept and apparatus that may be used to measure two-dimensional x-ray images of the inner surface inside of a borehole without the technical possibility to look inside of the borehole in a radial direction. However, it fails to teach a method or means of achieving such through the steel wall of a single or multiple well casings, and is therefore unable to discriminate the signal from behind said casings, from annular materials, such as cement.

U.S. Pat. No. 8,481,919 to Teague discloses a method of producing Compton-spectrum radiation in a borehole without the use of radioactive isotopes, and further describes rotating collimators around a fixed source installed internally to the apparatus, but does not have solid-state detectors with collimators. It further teaches of the use of conical and radially symmetrical anode arrangements to permit the production of panoramic x-ray radiation. However, the reference fails to teach of a means or method to achieve such through the steel wall of a single or multiple well casings, thereby is unable to discriminate the signal from behind said casings, from annular materials, such as cement. The reference also fails to teach of a non-padded (i.e. concentric) tooling technique within a single or multi-string cased hole environment.

US 2013/0009049 by Smaardyk discloses an apparatus that allows measurement of backscattered x-rays from the inner layers of a borehole. However, fails to teach of a means or method to achieve such through the steel wall of a single or multiple well casings, thereby is unable to discriminate the signal from behind said casings, from annular materials, such as cement.

U.S. Pat. No. 8,138,471 to Shedlock discloses a scanning-beam apparatus based on an x-ray source, a rotatable x-ray beam collimator and solid-state radiation detectors enabling the imaging of only the inner surfaces of borehole casings and pipelines. However, the reference fails to teach a method or means of achieving such through the steel wall of a single or multiple well casings, and is therefore unable to discriminate the signal from behind said casings from annular materials, such as cement.

U.S. Pat. No. 5,326,970 to Bayless discloses a concept for a tool that aims to measure backscattered x-rays from inner surfaces of a borehole casing with the x-ray source being based on a linear accelerator. However, the reference fails to teach of a means or method to measure scatter through the steel wall of a single or multiple well casings, thereby is unable to discriminate the signal from behind said casings from annular materials, such as cement.

U.S. Pat. No. 7,705,294 to Teague teaches an apparatus that aims to measure backscattered x-rays from the inner layers of a borehole in selected radial directions with the missing segment data being populated through movement of the apparatus through the borehole. The apparatus permits generation of data for a two-dimensional reconstruction of the well or borehole, but the publication does not teach of the necessary geometry for the illuminating x-ray beam to permit discrimination of the depth from which the backscattered photons originated, only their direction.

U.S. Pat. No. 5,081,611 to Hornby discloses a method of back projection to determine acoustic physical parameters of the earth formation longitudinally along the borehole using a single ultrasonic transducer and a number of receivers, which are distributed along the primary axis of the tool.

U.S. Pat. No. 6,725,161 to Hillis teaches a method of placing a transmitter in a borehole, and a receiver on the surface of the earth, or a receiver in a borehole and a transmitter on the surface of the earth, with the aim to determine structural information regarding the geological materials between the transmitter and receiver.

U.S. Pat. No. 6,876,721 to Siddiqui teaches a method of correlating information taken from a core-sample with information from a borehole density log. The core-sample information is derived from a CT scan of the core-sample, whereby the x-ray source and detectors are located on the outside of the sample, and thereby configured as an outside-looking-in arrangement. Various kinds of information from the CT scan such as its bulk density is compared to and correlated with the log information.

U.S. Pat. No. 4,464,569 to Flaum discloses a method of determining the elemental composition of earth formations surrounding a well borehole by processing the detected neutron capture gamma radiation emanating from the earth formation after neutron irradiation of the earth formation by a neutron spectroscopy logging tool.

U.S. Pat. No. 4,433,240 to Seeman discloses a borehole logging tool that detects natural radiation from the rock of the formation and logs said information so that it may be represented in an intensity versus depth plot format.

U.S. Pat. No. 3,976,879 to Turcotte discloses a borehole logging tool that detects and records the backscattered radiation from the formation surrounding the borehole by means of a pulsed electromagnetic energy or photon source, so that characteristic information may be represented in an intensity versus depth plot format.

U.S. Pat. No. 9,012,836 to Wilson et al. discloses a method and means for creating azimuthal neutron porosity images in a wireline environment. Similar to U.S. Pat. No. 8,664,587, the reference discloses an arrangement of azimuthally static detectors which could be implemented in a wireline tool to assist an operator in interpreting logs post-fracking, by subdividing the neutron detectors into a plurality of azimuthally arranged detectors which are shielded within a moderator to infer directionality to incident neutrons and gamma.

U.S. Pat. No. 4,883,956 to Manente et al. provides an apparatus and methods for investigation of subsurface earth formations using an apparatus adapted for movement through a borehole. Depending upon the formation characteristic or characteristics to be measured, the apparatus may include a natural or artificial radiation source for irradiating the formations with penetrating radiation such as gamma rays, x-rays or neutrons. The light produced by a scintillator in response to detected radiation is used to generate a signal representative of at least one characteristic of the radiation and this signal is recorded.

U.S. Pat. No. 6,078,867 to Plumb discloses a method of generating a three-dimensional graphical representation of a borehole, including at least the steps of receiving caliper data relating to the borehole, generating a three-dimensional wire mesh model of the borehole from the caliper data, and color mapping the three-dimensional wire mesh model from the caliper data based on either borehole form, rugosity and/or lithology.

U.S. Pat. No. 3,321,627 to Tittle discloses a system of collimated detectors and collimated gamma-ray sources to determine the density of a formation outside of a borehole, optimally represented in a density versus depth plot format.

However, the reference fails to teach of a means or method to achieve such through the steel wall of a single or multiple well casings.

SUMMARY

An x-ray based cement evaluation tool for measurement of the density of material volumes within single, dual and multiple-casing wellbore environments is provided, the tool including at least an internal length comprising a sonde section, wherein said sonde section further comprises an x-ray source; a radiation shield for radiation measuring detectors; sonde-dependent electronics; and a plurality of tool logic electronics and PSUs, wherein the tool uses x-rays to illuminate the formation surrounding a borehole and a plurality of detectors are used to directly measure the density of the cement annuli and any variations in density within. Detectors used to measure casing standoff such that other detector responses are compensated for tool stand-off and centralization; a plurality of reference detectors is used to monitor the output of the x-ray source, and a shortest-axial offset detector is configured to distribute incoming photons into energy classifications such that photoelectric measurements may be made.

BRIEF DESCRIPTION OF SEVERAL EXAMPLE EMBODIMENTS

This invention describes a method and means to improve the resolution and determination of the density of the materials surrounding a wellbore in a package that does not require direct physical contact with the well casings (i.e., non-padded). The invention described and claimed herein consists of a method and means to use a pseudo-conical x-ray beam, located within a non-padded, concentrically-located borehole logging tool, for the purpose of detecting density variations within the annular materials surrounding a borehole within single or multi-string cased-hole environments.

The arrangement of the collimated detectors permits the collection of data that relates specifically to known azimuthal and radially located regions of interaction (azimuthally distributed depths of investigation). When said tool is moved axially within the well, a three-dimensional map of the densities of the annular materials surrounding the borehole can be created such that variations in the density of the annular materials may be analyzed to look for issues with cement integrity and zonal isolation, such as channels, or holes in the annular materials that could transmit pressure.

An example method comprises a combination of known and new technology in a new application with respect to radiation physics and cement and casing measurements for use within the oil and gas industry. Such methods are further embodied by a means, which may be used to practice the method for use in a water, oil or gas well. This example method benefits the monitoring and determination of cement integrity, zonal isolation, and well integrity, within cemented single or multi-string wellbore environments.

Figure 1:
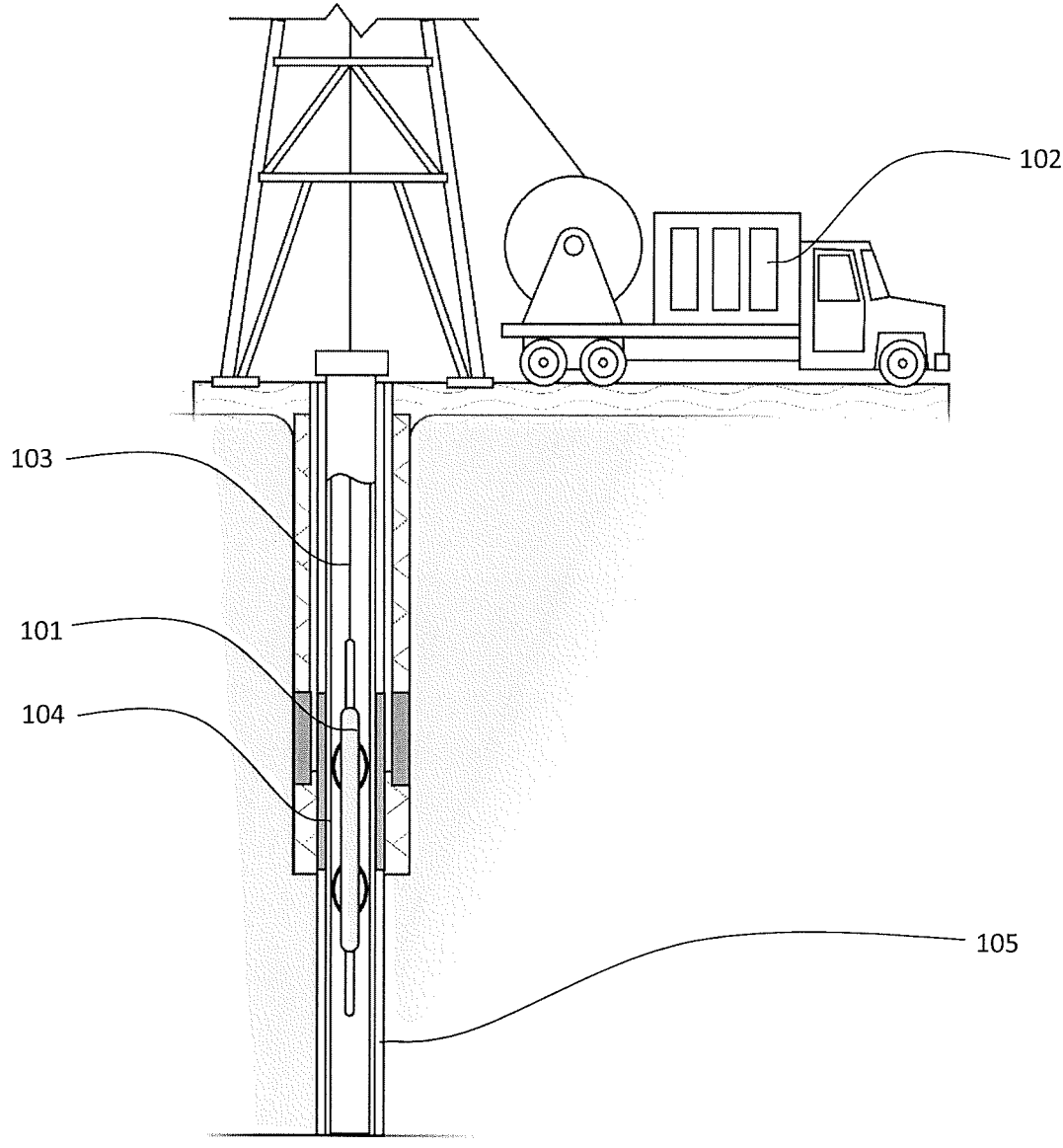
FIG. 1 illustrates an x-ray based cement evaluation tool deployed by wireline conveyance into a borehole, wherein the density of the cemented annuli is measured by the tool.

With reference now to the attached Figures, FIG. 1 illustrates an x-ray based cement evaluation tool [101] deployed by wireline conveyance [102,103] into a borehole [105], wherein the density of the cemented annuli [104] is measured by the tool [101].

Figure 2:
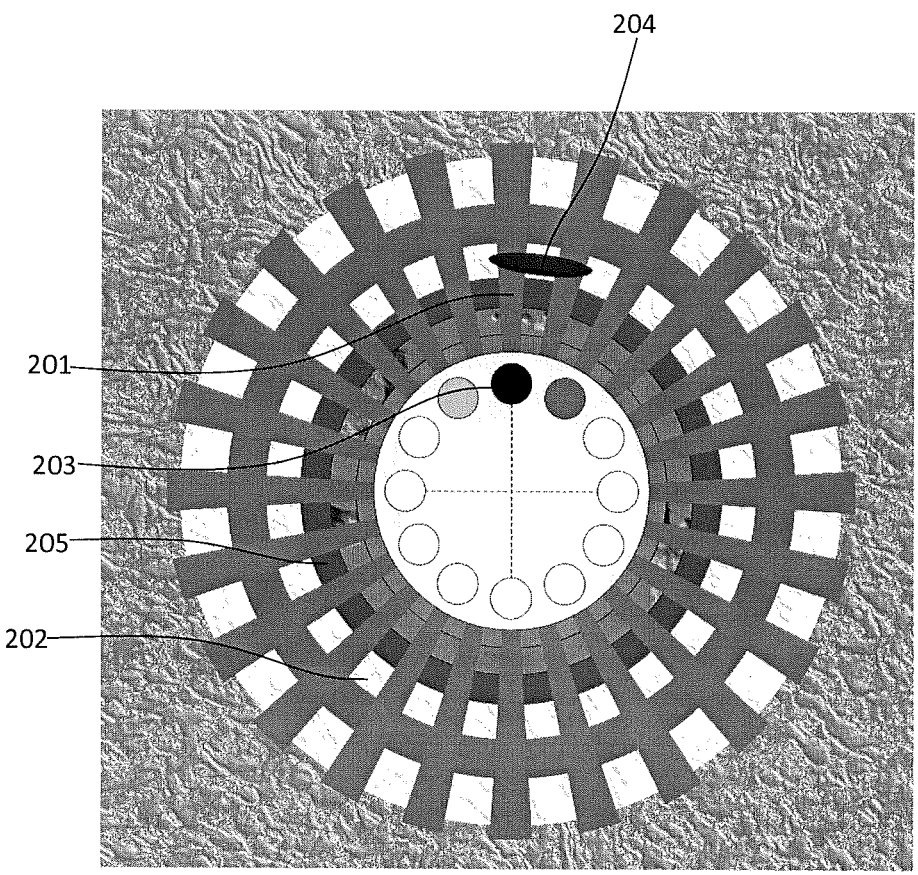
FIG. 2 illustrates an azimuthal plurality of x-ray beams made to create a pseudo-cone of x-ray.

FIG. 2 illustrates an azimuthal plurality of x-ray beams [201] made to create a pseudo-cone of x-ray. However, unlike a true cone, the separate fingers of the pseudo-cone can be employed to reduce the amount cross-talk in signal between detectors [203] i.e. anomalies [204] in the annular materials [202] surrounding the borehole and casings [205] will be detected by different azimuthally located detectors [203] at different rates, such that the most probable azimuthal location of the anomaly can be determined.

Figure 3:
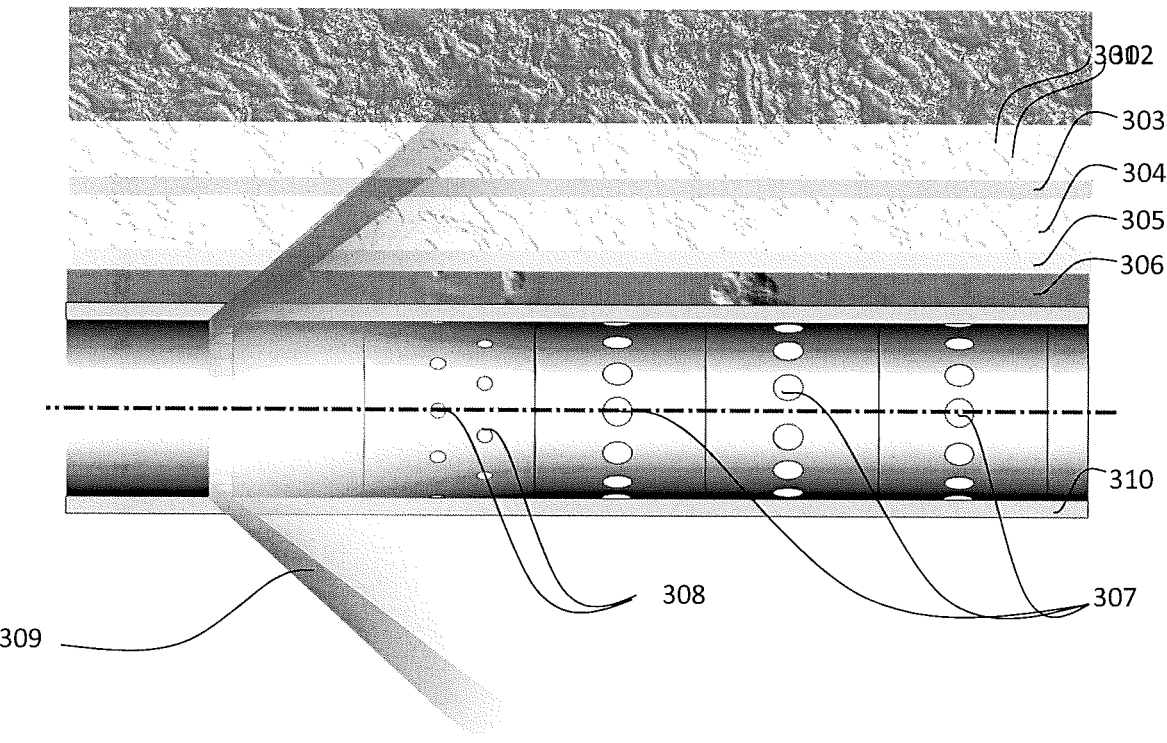
FIG. 3 illustrates an x-ray source and detectors located within a tool housing.

FIG. 3 illustrates an x-ray source and detectors [307, 308] located within a tool housing [310]. The tool is located within a fluid [306] filled cased borehole. The first casing [305 ] is bonded to a second casing [303] by a cement [304] filled annulus. The second casing [202] is bonded to the formation [301] by a second cement [302] filled annulus. As the conical x-ray beam [309] interacts with the media [301, 302, 303, 304, 305, 306] surrounding the borehole, the counts are detected at each axially offset group of detectors [307, 308]. Fluid and casing detector [308] data will be mostly attributable to single-event scatter mechanisms, whereas anomaly detector group [307] data will be mostly comprised of multiple scatter event mechanisms.

Figure 4:
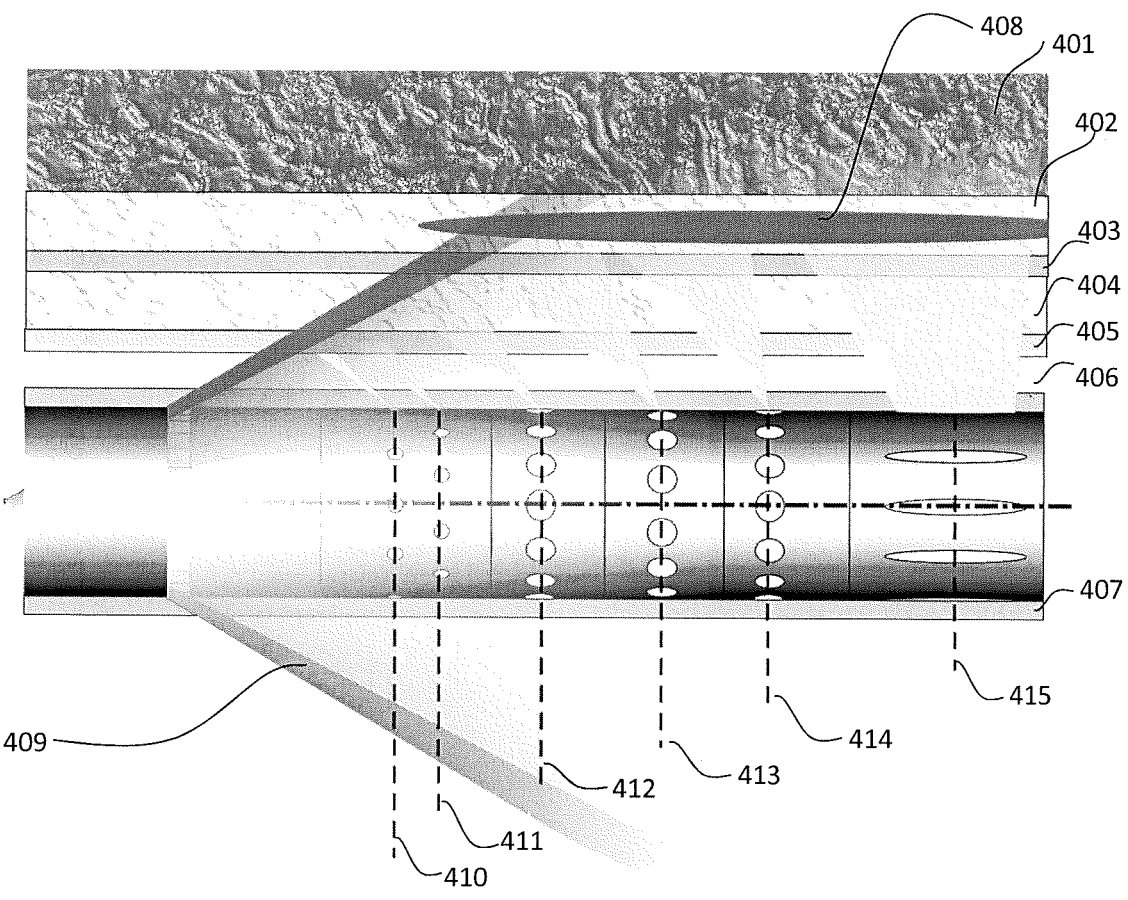
FIG. 4 illustrates an x-ray source and detectors located within a tool housing.

FIG. 4 illustrates an x-ray source and detectors [410, 411, 412, 413, 414, 415] located within a tool housing [407]. The tool is located within a fluid [406] filled cased borehole. The first casing [405] is bonded to a second casing [403] by a cement [404] filled annulus. The second casing [403] is bonded to the formation [401] by a second cement [402] filled annulus. As the x-ray beam [409] (here shown as a cone) interacts with the media [401, 402, 403, 404, 405, 406] surrounding the tool housing [407], the counts that are detected at each axially offset group of detectors [410, 411, 412, 413, 414, 415] is a convolution of the various attenuation factor summations of the detected photons as they travelled through and back through each 'layer' of the tool surroundings [401, 402, 403, 404, 405, 406]. As the axial offset (from the source) for the detector group increases, so does the amount of convolution of the detected signal. An additional function is the mean free path lengths of the various materials as a function of x-ray photon energy. 1st order detector [410] data will be mostly attributable to single-event scatter mechanisms, whereas 3rd-nth order [412 through 415] detector group data will be mostly comprised of multiple (Compton) scatter event mechanisms. The data from each detector may be de-convolved through the use of the data collected by the corresponding azimuthally-coherent detector with a lower axial offset (lower radial depth of investigation). Using a multi-step approach, the signal from each detector may be deconvolved such that the result is a measure of the density of the material within the depth of investigation (region of interest) of a specific detector.

Figure 5:
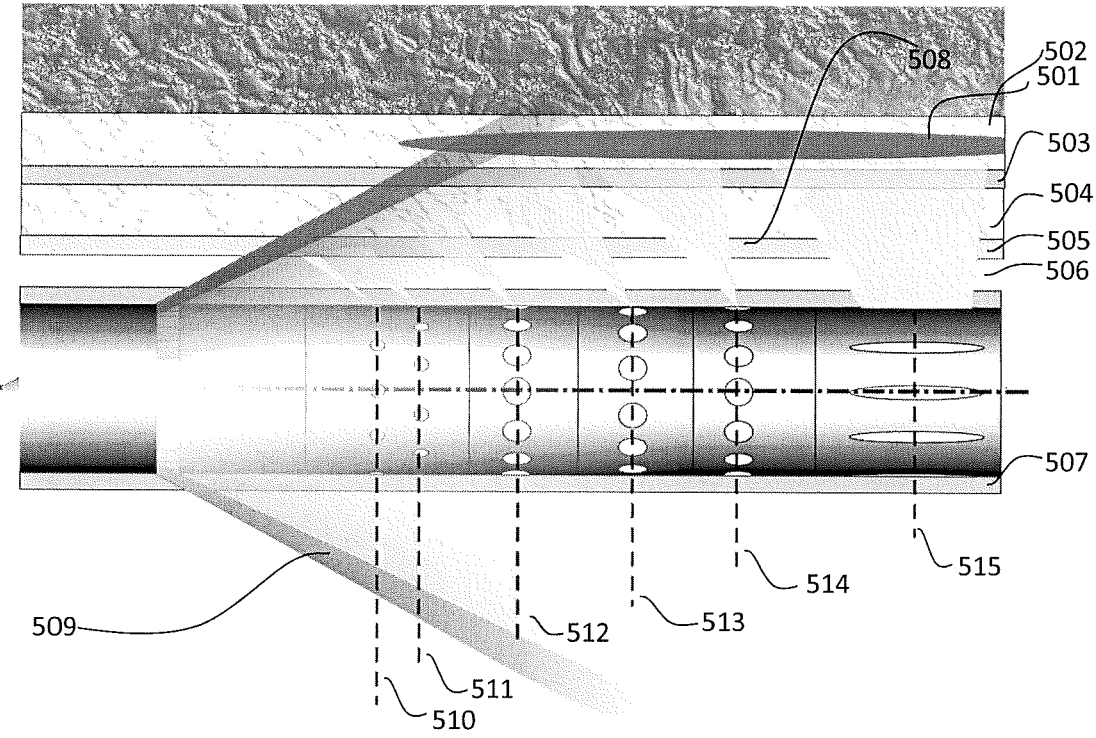
FIG. 5 illustrates an x-ray source and detectors located within a tool housing.

FIG. 5 illustrates an x-ray source and detectors [510, 511, 512, 513, 514, 515] located within a tool housing [507]. The tool is located within a fluid [506] filled cased borehole. The first casing [505] is bonded to a second casing [503] by a cement [504] filled annulus. The second casing [503] is bonded to the formation [501] by a second cement [502] filled annulus. As the x-ray beam [509] (here shown as a cone) interacts with the media surrounding the borehole, the counts that are detected at each axially offset group of detectors [510, 511, 512, 513, 514, 515] is a convolution of the various attenuation factor summations of the detected photons as they travelled through and back through each 'layer' of the tool surroundings [501, 502, 503, 504, 505, 506]. The data from each detector may be deconvolved through the use of the data collected by the 1st order detector group [510], to compensate for fluid-thickness [506] and casing [505] variations alone. Using a single-step approach, the signal from each detector may be compensated such that the result is a measure of the density of the material within the depth of investigation (region of interest) combined with a function of the attenuations and scattering cross-sections of the materials in lower depths of investigations (or lower axial offsets).

Figure 6:
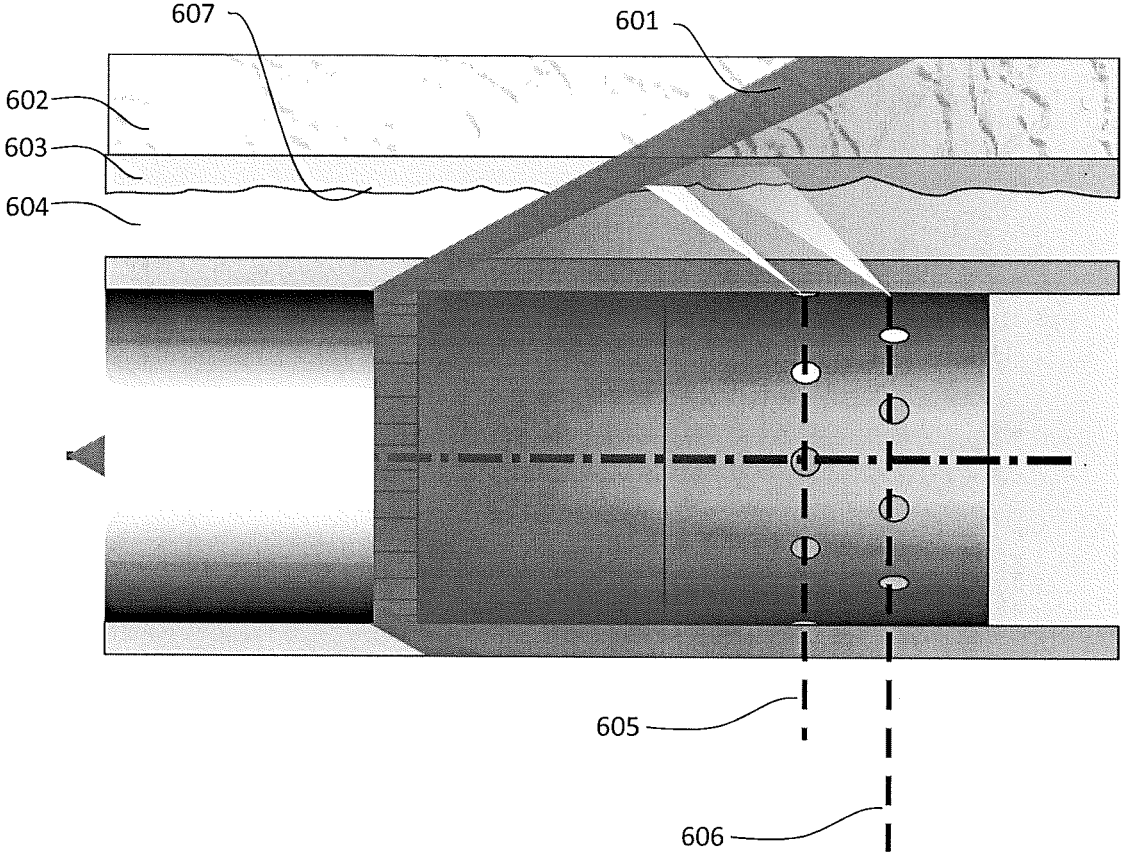
FIG. 6 illustrates a photoelectric measurement of the casing resulting from the interaction of the x-ray beam with the wellbore fluid and casing may be taken by the 2nd order detectors or the $1^{st}$ order detectors to ascertain the general quantity of materials associated with corrosion within the casing materials.

FIG. 6 illustrates a photoelectric measurement of the casing [603], resulting from the interaction of the x-ray beam [601] with the wellbore fluid [604] and casing [603] may be taken by the 2nd order detectors [606] or the $1^{st}$ order detectors [605] to ascertain the general quantity of materials associated with corrosion [607] within the casing materials. This measurement could also be combined with the radial offset measurement contributed by the 1st order detector [605] to determine a 'casing quality' index measurement. Casings are typically graded into dimensional groups by their outer diameter, and by weight per unit length. The dimensional variability of the casing is exhibited by the inner diameter. Consequently, corrosion of the inner casing surface, facing the wellbore fluids, can be determined by inner-diameter measurements alone using the measured intensity (by the $1^{st}$ order detectors [605]) of the x-ray beam [601] moving back and forth axially on the inner surface of the casing as the inner diameter varies.

Figure 7:
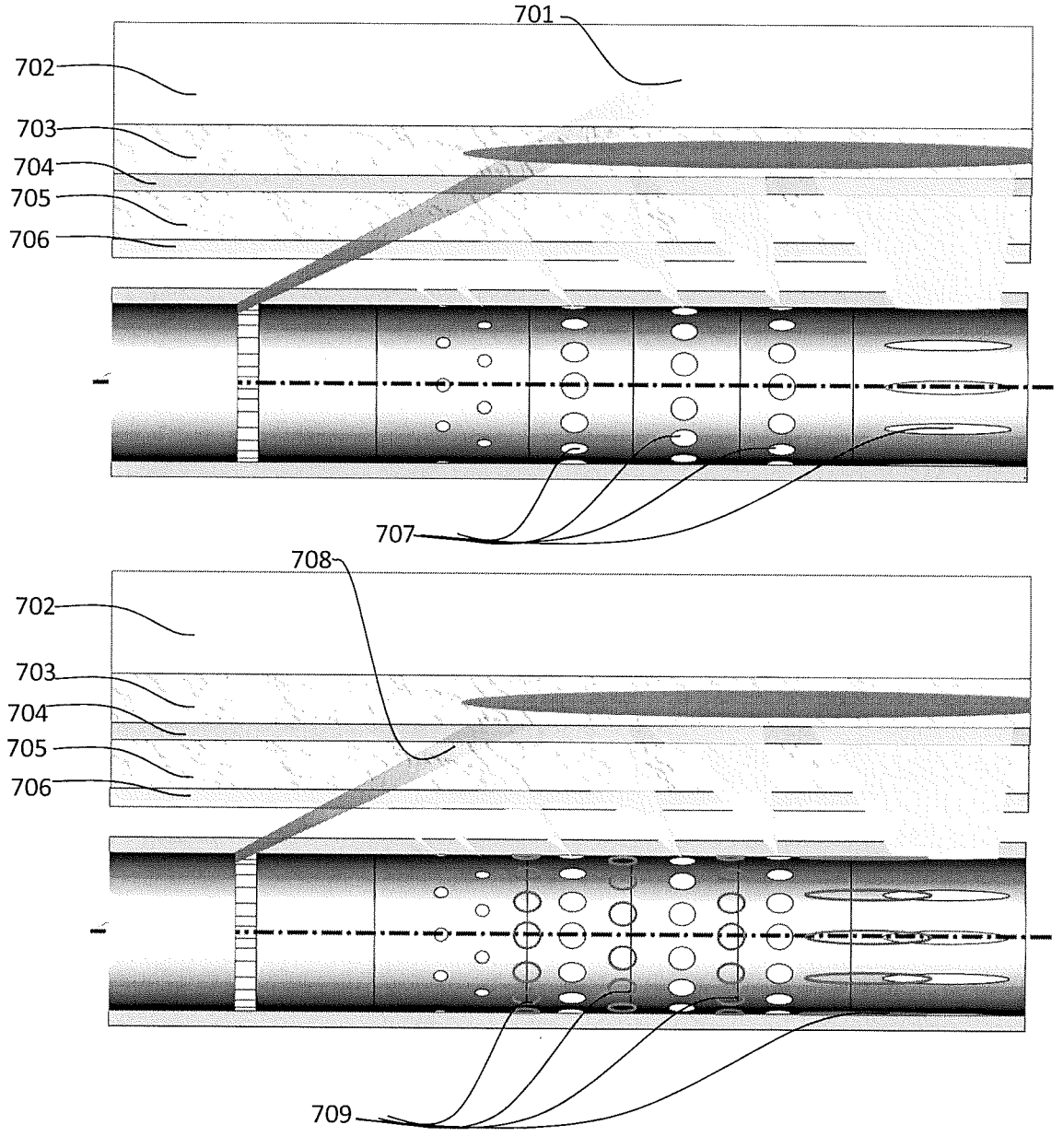
FIG. 7 illustrates the energy of the output x-ray beam modulated and optimum axial offset changes with respect to sensitivity for each detector group as a function of depth of investigation.

FIG. 7 illustrates the energy of the output x-ray beam [701] modulated and optimum axial offset changes with respect to sensitivity for each detector group [707], as a function of depth of investigation. A lowering of the x-ray beam's energy [708], will result in a reduction of the optimum axial offset of the detector groups [709]. However, as the physical detectors [707] remain static, the collected information relating from the modulation of x-ray beam can be used to ascertain varying levels of sensitivity functions for the region surrounding the borehole. In effect, acting like a synthetic aperture, and increasing radial resolution.

Figure 8:
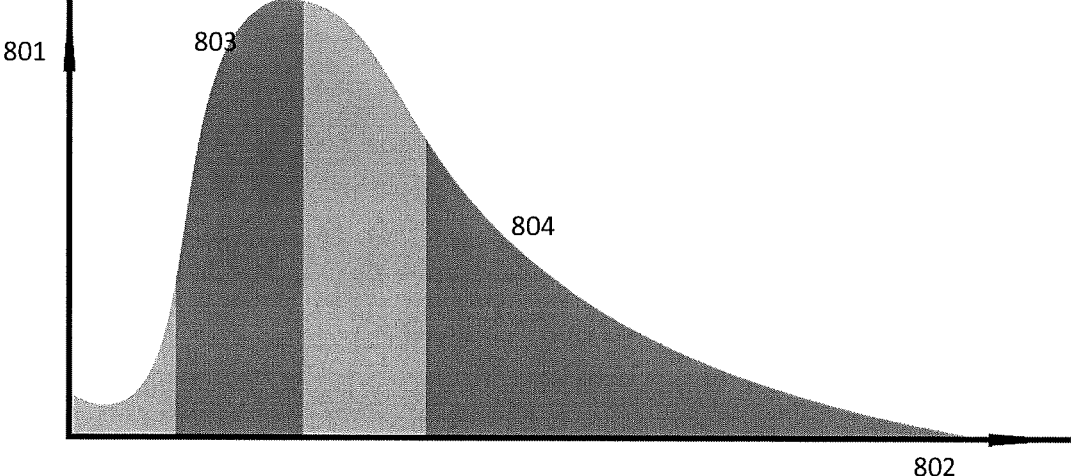
FIG. 8 illustrates a spectral representation of a $1^{st}$ order detector showing intensity versus photon energy.

FIG. 8 illustrates the spectral representation of a $1^{st}$ order detector showing intensity [801] versus photon energy [802]. The $1^{st}$ order detector can be used to collect a spectrum of incoming photons, or to collect based upon energy thresholds, wherein specific energy windows [803, 804] are used to separate between counts originating from Compton scattering events, and those originating from photoelectric. In this respect, photo electric energies would be represented by the counts within the low energy window [803], and Compton within the higher energy window [804]. The ratio of the counts collected within the two windows gives the basis of the photo electric measurement.

In one embodiment, an x-ray based cement evaluation tool [101] is deployed by wireline conveyance [102,103] into a borehole [105], wherein the density of the cemented annuli [104] is measured by the tool [101].

In a further embodiment, cylindrical collimators are used to give directionality to the output of an x-ray source that is located within the pressure housing of a borehole logging tool [101]. An azimuthal plurality of x-ray beams [201] can be made to create a pseudo-cone of x-ray. However, unlike a true cone, the separate fingers of the pseudo-cone [201] can be employed to reduce the amount cross-talk in signal between detectors [203] i.e. anomalies [204] in the annular materials [202] surrounding the borehole and casings [205] will be detected by different azimuthally located detectors [203] at different rates, such that the most probable azimuthal location of the anomaly can be determined. The x-ray source and detectors [307, 308] are located within a tool housing [310]. The tool is located within a fluid [306] filled cased borehole. The first casing [305] is bonded to a second casing [303] by a cement [304] filled annulus. The second casing [303] is bonded to the formation [301] by a second cement [302] filled annulus. As the conical x-ray beam [309] interacts with the media [301, 302, 303, 304, 305, 306] surrounding the borehole, the counts are detected at each axially offset group of detectors [307, 308]. Fluid and casing detector [308] data will be mostly attributable to single-event scatter mechanisms, whereas anomaly detector group [307] data will be mostly comprised of multiple scatter event mechanisms. The x-ray source and detectors [410, 411, 412, 413, 414, 415] are located within a tool housing [407]. As the x-ray beam [409] interacts with the media [401, 402, 403, 404, 405, 406] surrounding the tool housing [407], the counts that are detected at each axially offset group of detectors [410, 411, 412, 413, 414, 415] is a convolution of the various attenuation factor summations of the detected photons as they travelled through and back through each radial layer of the tool surroundings [401, 402, 403, 404, 405, 406]. As the axial offset (from the source) for the detector group increases, so does the amount of convolution of the detected signal. An additional function is the mean free path lengths of the various materials as a function of x-ray photon energy. 1st order detector [410] data will be mostly attributable to single-event scatter mechanisms, whereas 3rd-nth order [412 through 415] detector group data will be mostly comprised of multiple (Compton) scatter event mechanisms.

The data from each detector is deconvolved through the use of the data collected by the corresponding azimuthally-coherent detector with a lower axial offset (lower radial depth of investigation). Using a multi-step approach, the signal from each detector may be deconvolved such that the result is a measure of the density of the material within the depth of investigation (region of interest) of a specific detector.

In a further embodiment, the data from each detector may be deconvolved through the use of the data collected by the 1st order detector group [510], to compensate for fluid-thickness [506] and casing [505] variations alone. Using a single-step approach, the signal from each detector may be compensated such that the result is a measure of the density of the material within the depth of investigation (region of interest) combined with a function of the attenuations and scattering cross-sections of the materials in lower depths of investigations (or lower axial offsets).

The 1st order detector group's single scatter bias makes the group ideal for measuring offset between the tool housing and the casing through the well-fluids. As the tool is to be located mostly coaxially with the well-casing (i.e. not padded), it can be anticipated that the tool will remain mostly centralized. However, any slight variation in well casing diameter (ovality) or inefficiencies in the tool's centralizer mechanisms will result in a longer path length for the x-rays through the wellbore fluid. For this reason, the 1st order detectors are the primary compensating mechanism for changes in path-length and attenuation for the higher order detectors. In addition, comparison of each of the azimuthally distributed 1st order detectors can be employed, such that the physical location of the tool within the casing (as a function of offset from the centerline) can be determined. For example, the signal from one side of an eccentered tool will be different from the opposite side of the tool, the use of three or more detectors azimuthally in the group can help determine whether to tool is centered or not (as useful information), and the use of 5 or more detectors can achieve the same, but with the additional benefit of providing the means to create an elliptical function to determine the ovality of the casing.

A similar technique can be applied to the higher order detector groups. Where in, those detector groups that are associated with a region of interest (or radii of interest) associated with an 'outer' well casing, can be used to ascribe an elliptical function to determine where the inner-most casing is located compared to the outer-most casing, and hence, a metric of multi-string casing eccentricity may be solved.

Comparison of axially offset azimuthal groupings of detectors can also be used to determine the radial position of prospective 'density anomalies.' In this respect, if an anomaly is located within the outer annulus, between an outer casing and the formation, then only higher order detector groups should detect a change in incoming photon intensity/counts, whereas lower order detector groups' depth of investigation would be too low to detect said anomaly. An anomaly detected by a lower order detector group would be detected by both the lower order anomaly detectors and the higher order detectors, as the x-ray beam passes through all of those regions of interest. An anomaly located at a lower (inner) depth of investigation will have convoluting impact on the higher order detectors. This difference between the impact on higher and lower order detectors serves the basis for determining the radial position of a density anomaly located within the annular materials surrounding a borehole.

In one embodiment, the data collected from each azimuthal plane can be processed to create a two-dimensional density map (pixels) of the materials extending out from the surface of the tool to a significant distance into the formation surrounding the borehole, thereby capturing all of the density data for the materials as a function of axial position and radial position. In a further embodiment, the data collected from each 'azimuth' can be compared with neighboring azimuths to ascertain the azimuthal position of an anomaly, such that the two-dimensional maps can be amalgamated into a three-dimensional map (voxels) of the density data for the materials as a function of axial position, azimuthal and radial position.

During plug and abandonment operations, the quality of the casing may not be known. In a further embodiment, a photo-electric measurement of the casing [603], resulting from the interaction of the x-ray beam [601] with the wellbore fluid [604] and casing [603] may be taken by the 2nd order detectors [606] or the $1^{st}$ order detectors [605] to ascertain the general quantity of materials associated with corrosion [607] within the casing materials. This measurement could also be combined with the radial offset measurement contributed by the 1st order detector [605] to determine a 'casing quality' index measurement. Casings are typically graded into dimensional groups by their outer diameter, and by weight per unit length. The dimensional variability of the casing is exhibited by the inner diameter. Consequently, corrosion of the inner casing surface, facing the wellbore fluids, can be determined by inner-diameter measurements alone using the measured intensity (by the $1^{st}$ order detectors [605]) of the x-ray beam [601] moving back and forth axially on the inner surface of the casing as the inner diameter varies. The $1^{st}$ order detector can be used to collect a spectrum of incoming photons, or to collect based upon energy thresholds, wherein specific energy windows [803, 804] are used to separate between counts originating from Compton scattering events, and those originating from photoelectric. In this respect, photo electric energies would be represented by the counts within the low energy window [803], and Compton within the higher energy window [804]. The ratio of the counts collected within the two windows gives the basis of the photo electric measurement.

In a further embodiment, all detectors are configured to measure energy spectra, such that the spectral information could be used to perform spectroscopic analysis of the materials surrounding the borehole for improved materials recognition. In a further embodiment, machine learning would be employed to automatically analyze the spectral (photo electric or characteristic energy) content of the logged data to identify key features, such as corrosion, holes, cracks, scratches, and/or scale-buildup. In a further embodiment, machine learning would be employed to automatically analyze the resulting data from historical logs produced by the same tool in order to better determine the most optimum location to perform fracturing of the formation.

In other embodiments, the data collected can either be presented as traditional 2D logs (as a function of depth), as a voxelated three-dimensional density model, as slices or sections of such. In an alternative embodiment, the data is further processed through machine learning, such that a neural network is trained to look for signal abnormalities, or by setting simple discriminators on the (calibrated) gradients and differences between axially offset detector group data collections. This technique is particularly powerful when combined with source voltage modulation, i.e., changing sensitivity functions. In a further embodiment, the tool is used to determine the position, distribution and volume of fractures, either natural or artificial, within the formation surrounding the cased wellbore.

In a further embodiment, the tool [101] is located within a logging-while-drilling (LWD) string, rather than conveyed by wireline. In a further embodiment, the LWD provisioned tool [101] would be powered by mud turbines. In a further embodiment, the LWD provisioned tool would be powered by batteries.

In a further embodiment, the LWD provisioned tool would be used to determine the position, distribution and volume of fractures, either natural or artificial, within the formation surrounding the wellbore. In yet another embodiment, the LWD provisioned tool would be used to determine whether the bottom-hole-assembly of the drilling apparatus is remaining within its desired geological bed by constantly measuring the azimuthal distribution of formation densities.

In a still further embodiment, the tool [101] is combinable with other measurement tools such as neutron-porosity, natural gamma and/or array induction tools.

In a further embodiment, an azimuthally segmented acoustic measurement (such as to measure cement bond azimuthally) could be integrated into the tool, such that the quality of the cement bond to the first casing could be ascertained without the need for an additional tool or logging run.

An associated example method resolves the radial and azimuthal location of density variations in the materials surrounding a borehole without the use of pads. Additionally, the method requires no pre-modelling of the materials surrounding the borehole (as with acoustic tools).

The technique does not rely upon the quality of the physical bond between various annular materials, such as with acoustic methods. Moreover, the technique can be used with multiple casing strings to determine whether any anomalies exist that could reduce well integrity, zonal isolation or cement integrity.

The data collected is a direct measurement, rather than inferred through a model. The technique is not padded, i.e., the source and detectors do not need to be in physical contact with the well casings. In some embodiments, the technique works independently of the fluid currently in the well.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. An x-ray based borehole evaluation tool comprising:
an x-ray source;
a first detector group of azimuthally distributed detectors that is offset from the x-ray source in an axial direction by a first distance, the first detector group to measure density within a first radial depth of the tool using radiant energy generated by the x-ray source; and
a second detector group of azimuthally distributed detectors that is offset from the x-ray source in the axial direction by a second distance greater than the first distance, the second detector group to measure density within an annular region located between the first radial depth and a second radial depth greater than the first radial depth using the radiant energy, the second detector group comprising azimuthally-adjacent detectors to measure azimuthal density variations within the annular region,
wherein the tool is to deconvolve data from each detector using data from a corresponding azimuthally-coherent detector with a lower axial offset relative to the x-ray source.

2. The tool of claim 1, further comprising an additional detector to measure casing standoff such that other detector responses may be compensated for tool stand-off and centralization.

3. The tool of claim 1, further comprising a shortest-axial offset detector to generate photoelectric measurements by distributing incoming x-ray photons into energy classifications.

4. The tool of claim 3, wherein the shortest-axial offset detector is offset from the x-ray source in the axial direction by a third distance less than the first distance.

5. The tool of claim 1, wherein the tool is to vary an optimum-detector axial offset with respect to response sensitivity for the second detector group by modulating the radiant energy.

6. The tool of claim 1, wherein the tool is combinable with other measurement tools comprising one or more of neutron-porosity, natural gamma and array induction tools.

7. The tool of claim 1, further comprising an acoustic based measurement tool.

8. The tool of claim 1, wherein the tool is to determine a position, distribution and volume of fractures, either natural or artificial, within a formation.

9. The tool of claim 1, wherein the tool is integrated into a logging-while-drilling assembly.

10. The tool of claim 1, wherein the tool is powered by mud-turbine generators.

11. The tool of claim 1, wherein the tool is powered by batteries.

12. The tool of claim 1, wherein a first detector of the first detector group and a second detector of the second detector group are azimuthally-coherent detectors with a common azimuthal measurement direction and different axial offsets relative to the x-ray source, the azimuthally-coherent detectors to measure radial density variations in the common azimuthal measurement direction.

13. The tool of claim 1, further comprising a cylindrical collimator surrounding the x-ray source to control directionality of the radiant energy.

14. A method of using an x-ray based borehole evaluation tool, the method comprising:

generating, by a first detector group of the tool, first output data that characterizes density within a first radial depth of the tool using radiant energy emitted by an x-ray source of the tool positioned within a borehole, the first detector group formed by azimuthally distributed detectors that are offset from the x-ray source in an axial direction by a first distance;

generating, by a second detector group of the tool using the radiant energy, second output data that characterizes density within an annular region located between the first radial depth and a second radial depth of the tool greater than the first radial depth, the second detector group formed by azimuthally distributed detectors that are offset from the x-ray source in the axial direction by a second distance greater than the first distance;

deconvoluting the second output data using lower order output data to reduce multiple Compton scatter event mechanisms within the second output data, the lower order output data characterizing density within a lower radial depth of the tool that is less than the second radial depth;

detecting a radial position of a density variation within the annular region using the first output data and the second output data; and detecting an azimuthal position of the density variation using the second output data generated by azimuthally-adjacent detectors of the second detector group.

15. The method of claim 14, wherein a first detector of the first detector group and a second detector of the second detector group are azimuthally-coherent detectors with a common azimuthal measurement direction, the method further comprising:

detecting a radial position of the density variation in the common azimuthal measurement direction using the first output data and the second output data generated by the azimuthally-coherent detectors.

16. The method of claim 14, further comprising:

creating a two-dimensional density map using the first output data and the second output data, the two-dimensional density map characterizing density as a function of axial position and radial position with respect to the tool.

17. The method of claim 14, further comprising:

creating a plurality of two-dimensional density maps of the formation using the first output data and the second output data; and creating a three-dimensional density map using the plurality of two-dimensional density maps, the three-dimensional density map indicative of density as a function of axial position, azimuthal position, and radial position with respect to the tool.

18. The method of claim 14, wherein the lower order output data and the lower radial depth are the first output data and the first radial depth, respectively, the method further comprising:

deconvoluting, using the first output data, third output data generated by a third detector group of the tool that is offset from the x-ray source in the axial direction by a third distance greater than the second distance, the third output data characterizing density within a third radial depth of the tool that is greater than the second radial depth.

19. The method of claim 14, wherein the lower order output data and the lower radial depth are fourth output data and a fourth radial depth, respectively, the method further comprising:

deconvoluting the first output data using the fourth output data that characterizes density within the fourth radial depth of the tool that is less than the first radial depth, the fourth output data generated by a fourth detector group of the tool that is offset from the x-ray source in the axial direction by a fourth distance less than the first distance.

20. The method of claim 14, wherein the first detector group includes a shortest-axial offset detector, the method further comprising:

generating photoelectric measurements using the shortest-axial offset detector by distributing incoming x-ray photons into energy classifications.

* * * * *